April 16, 1968        J. H. CONN        3,377,845
MOMENT OF INERTIA TEST FIXTURE
Filed April 6, 1965        2 Sheets-Sheet 2
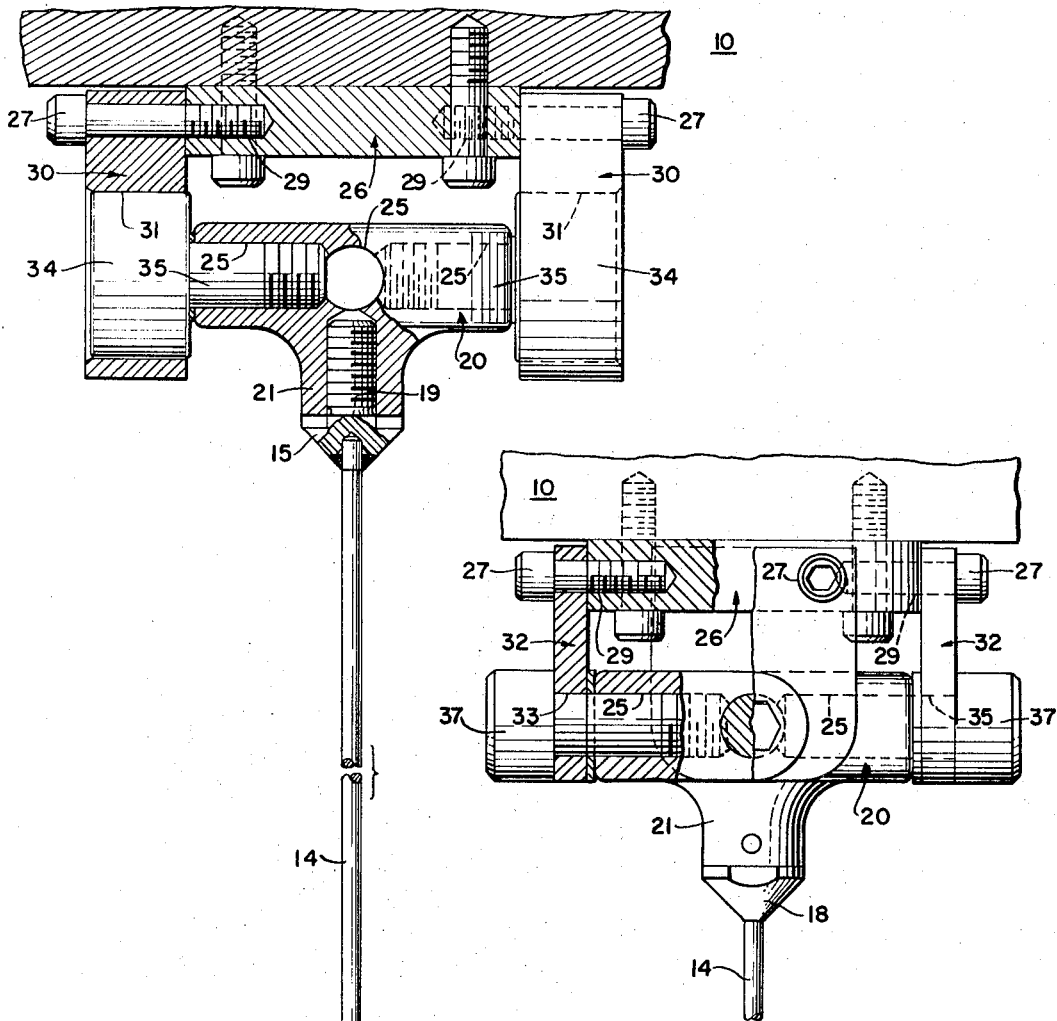
FIG.2.
FIG.4.
INVENTOR
Joseph H. Conn
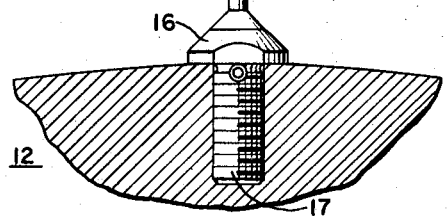
BY
ATTORNEYS

United States Patent Office 3,377,845
Patented Apr. 16, 1968

3,377,845
MOMENT OF INERTIA TEST FIXTURE
Joseph H. Conn, Riverdale, Md., assignor to the United States of America as represented by the Administrator of the National Aeronautics and Space Administration
Filed Apr. 6, 1965, Ser. No. 446,131
4 Claims. (Cl. 73—65)

ABSTRACT OF THE DISCLOSURE

A test fixture to enable the moment of inertia of a complex, irregularly shaped body to be determined about mutually perpendicular axes without the rotation of the axes of the body, which employs a long, thin suspension rod rigidly fixed to a reference surface at one end and to the test body at the other end. For making measurements with respect to one axis by the pendulum method, the reference surface is suspended from bearings such that the rod and the test body is free to move as a simple pendulum. To make measurements about an axis perpendicular to the suspension rod by the torque method, means are provided to prevent movement as a simple pendulum to also enable the test body to oscillate about the longitudinal axis of the suspension rod.

---

The invention described herein may be manufactured and used by and for the Government of the United States of America for governmental purposes without the payment of any royalties thereon or therefor.

This invention relates generally to techniques for determining the moment of inertia of an irregularly shaped body, and more particularly to a test fixture for simplifying the determination of the moment of inertia of such bodies about more than one axis.

Two of the most direct techniques for measuring the moment of inertia of an irregularly shaped body are the torque method and the pendulum method. Briefly, in the torque method the body is rigidly suspended from a fixed point by a torsion rod. The body is then twisted slightly and released so that it oscillates about the longitudinal axis of the torsion rod. With the mass of the irregularly shaped body known, with suitable calibration provided by the use of a reference body of known shaped mass, and by using known elastic equations, the moment of inertia of the irregularly shaped body can be determined. The moment of inertia in this instance is taken about an axis of the body that is an extension of the longitudinal axis of the torsion rod; preferably this axis passes through the center of gravity of the body.

In the pendulum method the body is freely suspended from a fixed point and then caused to swing as a pendulum of one degree of freedom. The moment of inertia is then determined from the period of oscillation, by use of known pendulum equations, in a manner similar to the previously described method. The axis about which the moment of inertia is taken in this instance is the axis of rotation for a pendulum of one degree of freedom, and this axis is perpendicular to the rod of the pendulum. Further details of these and other methods for determining the moment of inertia of an irregularly shaped body is described in an article by D. M. Ellett on pages 184–187 of Product Engineering, May 1957.

In the above described (and other) methods, in order to determine the moment of inertia of an irregularly shaped body, it is the general practice to rotate the body to a prescribed axis for each determination. Thus, in order to determine the moment of inertia about the principal axis of the body (i.e., those providing the maximum and minimum moment of inertia), it is required to rotate the body 90° with respect to a reference plane for each determination. However, when the body under consideration is a delicate and complicated instrument, such as a satellite or a spacecraft, there is often only one point at which the body can be secured to the fixture utilized for the test. In the instance of a satellite, for example, this point is usually the point at which the satellite is secured to the launch vehicle, and it is often desirable to determine the moment of inertia about an axis extending through this point and about two other axes, usually normal to the first mentioned axis.

It is, therefore, an object of the present invention to provide a test fixture wherein a delicate, irregularly shaped body such as a satellite may be mounted with respect to a reference plane from a single, fixed point to enable the moment of inertia thereof determined about at least three axes.

Another object of the invention is to provide a test fixture to enable the moment of inertia of a complex, irregularly shaped body to be simply determined about at least three mutually perpendicular axes by the pendulum and the torque methods.

In accordance with the above objects there is provided a test fixture having a long, thin rod (torsion rod) mounted from a reference surface by a set of bearings that allow the rod to swing freely as a pendulum having one degree of freedom. An irregularly shaped body (such as a satellite) is attached to the other end of the rod. This enables the moment of inertia of the body to be determined for an axis parallel to the axis of the bearings utilizing the pendulum method. The torsion rod is also adapted to be rigidly fixed to the reference surface so that the body may be twisted and released to oscillate about the longitudinal axis of the rod. This allows the moment of inertia to be determined for an axis perpendicular to the axis of the bearings by the torque method. The irregularly shaped body under test does not have to be removed or remounted in a different position, thus simplifying the design and handling of the satellite. In addition, the center of gravity does not have to be physically located at the satellite, and the moment of inertia can be determined for different configurations of satellite appendages without changes in the test arrangement.

The various features and attending advantages of the invention will become apparent from the following description when taken in conjunction with the accompanying drawings, in which:

FIGURE 2 is a plane view, in partial section, of the test fixture of FIGURE 1;

FIGURE 3 is a perspective view of the moment of inertia test fixture of the invention adapted for the torsion rod method; and FIGURE 4 is a plane view, in partial section, of the test fixture of FIGURE 3.

Figure 1:
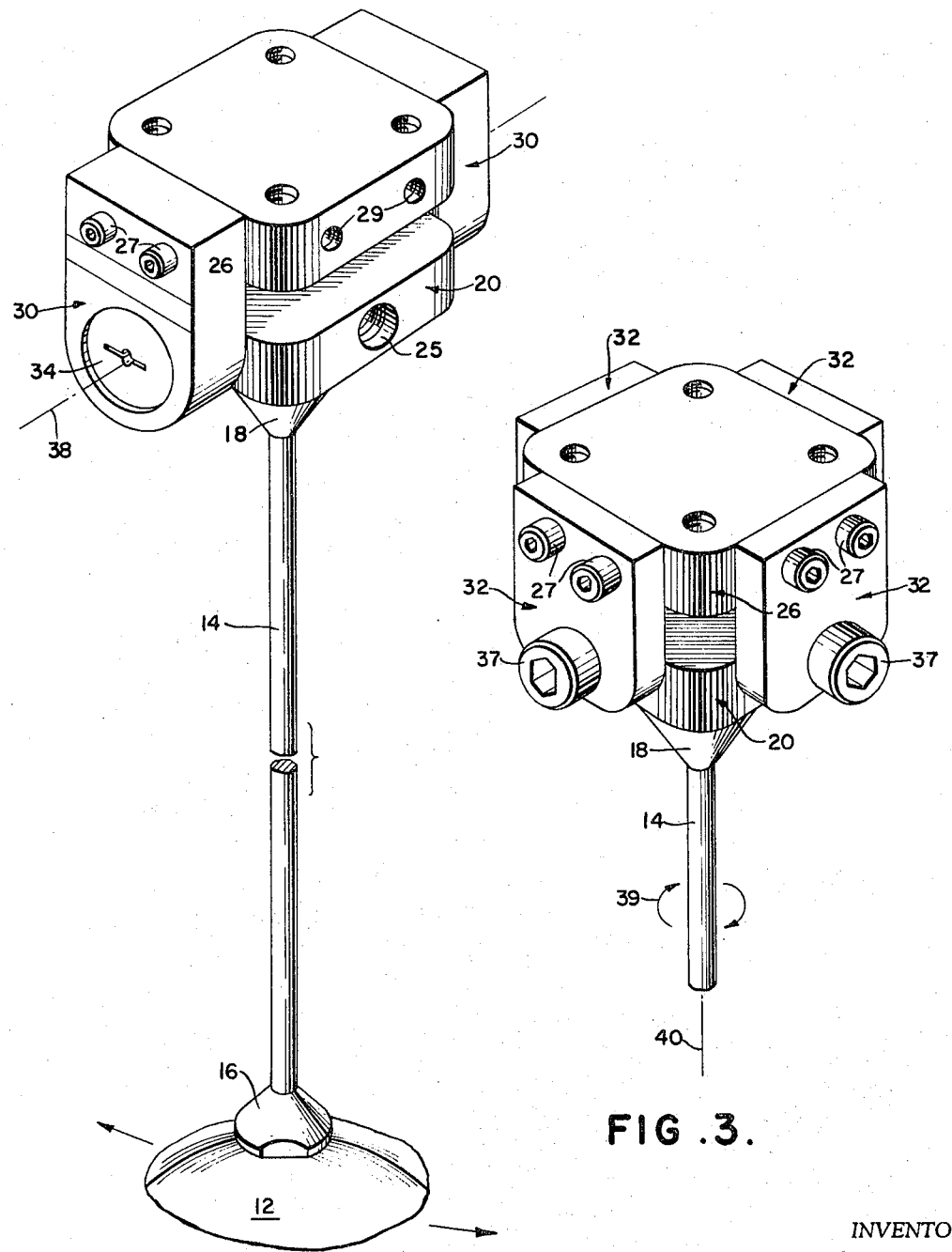
FIGURE 1 is a perspective view of the moment of inertia test fixture of the present invention adapted for the pendulum method.

In the drawings numeral 10 indicates a reference surface and numeral 12 indicates an irregularly shaped body, such as a satellite or a spacecraft, the moment of inertia of which is to be determined. Body 12 is suspended from reference surface 10 in the manner subsequently described by a pendant rod 14.

With particular reference to FIGURES 1–4, rod 14 is an elongated, thin metal rod terminated at each end by shoulders 16 and 18, respectively. Shoulder 16 has a longitudinally extending threaded portion 17 to engage body 12 at a specific point. By way of example, when body 12 is a satellite or spacecraft, this point may be the point at which it is secured to a rocket or launch vehicle. Shoulder 18 has a longitudinally extending threaded portion 19 which engages boss 21 of torsion bar support plate 20. The upper portion of torsion bar support plate 20 is generally square or rectangular in its horizontal dimensions, and of sufficient height to provide clearance for four internally threaded holes 25 that extend from each peripheral edge of torsion bar support plate 20 towards its center. There is also provided a mounting plate 26, securely fastened to reference surface 10. Each edge of mounting plate 26 is provided with a pair of internally threaded holes 29, disposed such that either bearing support plates 30 or torque plates 32 may be utilized to secure torsion bar support plate 20 to mounting plate 26 in the manner illustrated.

When the moment of inertia is to be determined by the pendulum method, torsion bar support plate 20 is suspended from mounting plate 26 by bearing support plates 30 and cam follower bearings 34 (FIGURES 1 and 2). To this end, the bearing support plates 30 are located on opposite sides of torsion bar support plate 20 and mounting plate 26. The top of each bearing support plate 30 is bolted to mounting plate 26 (utilizing bolts 27 in conjunction with internally threaded holes 29) and an intermediate portion of each bearing support plate 30 has a bore 31 to receive and provide a running fit for the outer race of cam follower bearings 34. The shaft 35 of each cam follower bearing 34 (integral with its inner race) extends inwardly and is threaded into a mating hole 25 of support plate 20. This arrangement allows body 12 to be suspended from support plate 20 by rod 14 in a manner that enables rod 14 and body 12 to swing freely about axis 38 of bearings 34 as a pendulum of one degree of freedom. As a result, the moment of inertia of body 12 may be determined by the pendulum method previously mentioned.

When the moment of inertia is determined by the torsion rod method, support plate 20 is securely fastened to mounting plate 26 by torque plates 32 (FIGURES 2 and 4). To this end, torque plates 32 are located on each of two, and preferably four, sides of support plate 20 and mounting plates 26. The top of each torque plate 32 is bolted to mounting plate 26 (utilizing bolts 27 and internally threaded holes 29) and an intermediate part of each torque plate 32 has a bore 33 to receive mounting bolts 37, which bolts are threaded into holes 25 of support plates 20. Conveniently bolts 37 have the same diameter and thread as shaft 35 of cam follower bearings 34. By this arrangement, body 12 is rigidly suspended from mounting plate 20 (and hence from reference surface 10) by rod 14, with rod 14 functioning as a torsion bar. Thus, by rotating body 12, as indicated by arrows 39, the moment of inertia of body 12 may be determined by the torque method mentioned above. It is to be noted that in this instance the moment of inertia is determined about an axis 40 of body 12 that is coextensive with the longitudinal axis of rod 14, and that this axis is perpendicular to axis 38 of bearings 34 about which the moment of inertia is determined by the pendulum method. For most satellite configurations this allows the moment of inertia to be determined about three orthogonal axes, that is, the axes that are mutually perpendicular to each other.

In a practical application, the above described test fixture may initially be set up to allow the moment of inertia to be determined by either the pendulum or torque method. If the pendulum method is utilized first, mounting plate 20 is initially suspended from support plate 26 by a first pair of bearing support plates 30 and cam follower bearings 34, utilizing threaded holes 25 and 29 on one pair of opposite edges of torsion bar support plate 20 and mounting plate 26. This provides the moment of inertia about one axis perpendicular to the longitudinal axis of rod 14. A second pair of bearing support plates 30 and cam follower bearings 34 may then be similarly located on a second pair of opposite edges of torsion bar support plate 20 and mounting plate 26, and the first pair of bearing support plates 30 and cam follower bearings 34 removed. This provides the moment of inertia about a second axis, 90° displaced, and also perpendicular to the longitudinal axis of rod 14. Subsequently, a pair of torque plates 32 are bolted on two sides, opposite to those to which bearing support plates 30 are mounted. In some instances this provides sufficient rigidity to carry out the torque method. Where greater rigidity is desired, particularly where there is lateral play due to the tolerances of cam follower bearings 34, bearing support plates 30 are removed and replaced by a second pair of torque plates 32. Once mounting plate 20 is rigidly secured to support plate 26 by torque plates 32, the moment of inertia is determined about an axis coextensive with the longitudinal axis of rod 14 and perpendicular to the two axes of the pendulum method.

If the torque method is utilized first, mounting plate 20 is initially firmly secured to support plate 26 by at least two, and preferably four torque plates 32. Subsequently, two opposing torque plates 32 are removed and replaced by a pair of bearing support plates 30. Once cam follower bearings 34 are in place, the other pair of torque plates 32 are removed and body 12 is free to swing as a pendulum having one degree of freedom. The plane of this pendulum may then be changed 90° in the manner previously mentioned.

The invention provides, therefore, a test fixture that enables the moment of inertia of a complex, irregularly shaped body to be determined about at least three mutually perpendicular axes without requiring that the axes of the body be rotated. As a consequence, the moment of inertia of such body may be determined by both the pendulum and the torque method without removal of the body from the fixture. This is particularly advantageous for use with satellites, wherein there is often only one convenient or practical point at which the spacecraft or satellite can be secured to the test fixture.

While a specific embodiment of the invention has been described with particularity, it should be apparent to those skilled in the art that certain modifications and variations thereof are possible in light of the above teachings. It is, therefore, to be understood that within the scope of the appended claims, the invention may be practiced otherwise than as described herein.

What is calimed as new and desired to be secured by Letters Patent of the United States is:

1. A test fixture to enable the moment of inertia of a complex, irregularly shaped body to be determined about mutually perpendicular axes without the rotation of the axes of said body, said test fixture including in combination, an elongated torsion rod for suspending said body from one end thereof, means for mounting the other end of said torsion rod to a reference surface such that said body and said torsion rod are free to move as a simple pendulum having one degree of freedom, and means adaptable to secure said torsion rod normal to said reference surface and prevent movement thereof as a simple pendulum, such that a torque may be imparted to said body about an axis normal to the plane of said reference surface, whereby the moment of inertia of said body may be selectively determined about an axis parallel to the plane of said reference surface by the pendulum method and about an axis normal to the plane of said reference surface by the torque method.

2. The test fixture of claim 1 wherein said means for mounting said other end of said torsion rod to said reference surface includes bearing means to allow said torsion rod and said irregularly shaped body to swing freely about the axis of rotation of said bearing means as a pendulum of one degree of freedom.

3. The test fixture of claim 1 wherein said other end of said torsion rod terminates in a support plate having a major surface parallel to said reference surface, and includes means for fixedly securing said other end of said support plate to said reference surface such that said torsion rod is maintained normal to said reference surface so that a torque may be applied to said body about an axis normal to the plane of said reference surface.

4. A test fixture to enable the moment of inertia of a complex, irregularly shaped body to be determined about at least three mutually perpendicular axes without the rotation of the axes of said body, said test fixture including in combination, an elongated torsion rod for suspending said body from one end thereof, means for mounting the other end of said torsion rod to a reference surface such that said body and said torsion rod are free to move as a simple pendulum having one degree of freedom selectively in one of two planes perpendicular to one another, and means adapted to secure said torsion rod normal to said reference surface and prevent movement thereof as a simple pendulum such that a torque may be imparted to said body about an axis normal to the plane of said reference surface, whereby the moment of inertia of said body may be determined about two mutually perpendicular axes both parallel to the plane of said reference surface by the pendulum method and about an axis normal to the plane of said reference surface by the torque method.

References Cited

UNITED STATES PATENTS 3,106,091  10/1963  Korr _____ 73—65

OTHER REFERENCES

Publication: Product Engineering, May 1957, pp. 184–187, "How to Determine Mass Moments of Inertia for Irregular Parts," by D. M. Ellett.

JAMES J. GILL, *Primary Examiner.*

R. A. SALZMAN, *Assistant Examiner.*